Figure 2C:
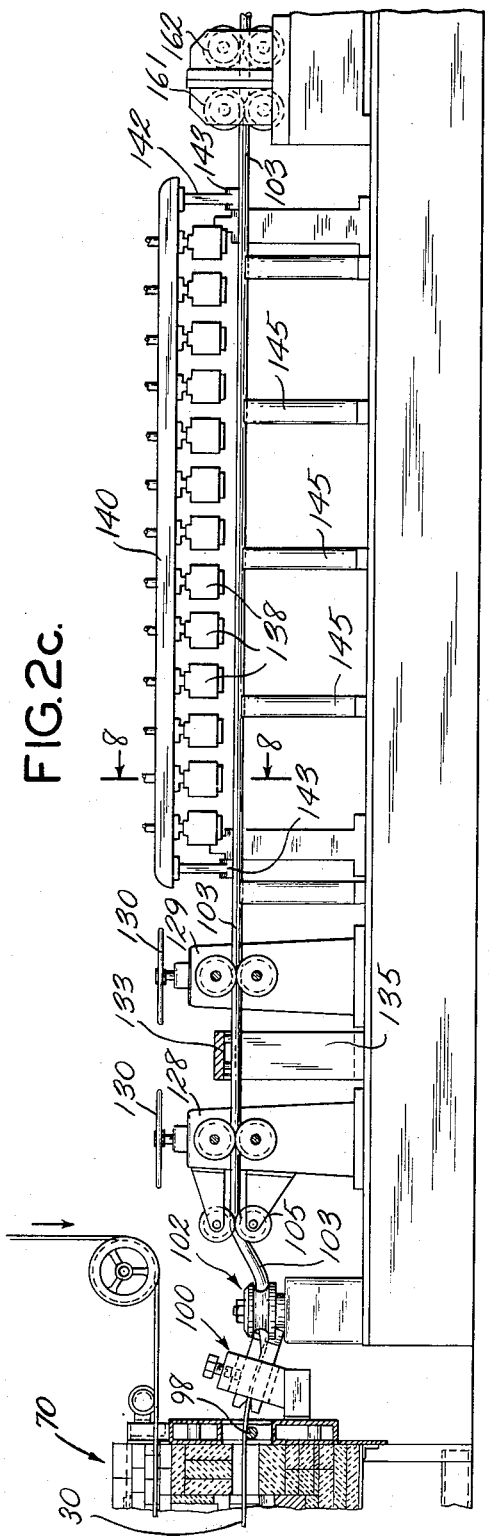

June 5, 1956  F. J. KENNEDY  2,748,734
CONTINUOUS TUBE WELDING APPARATUS WITH MULTI-STAGE HEATING
Filed Nov. 9, 1950  5 Sheets-Sheet 1
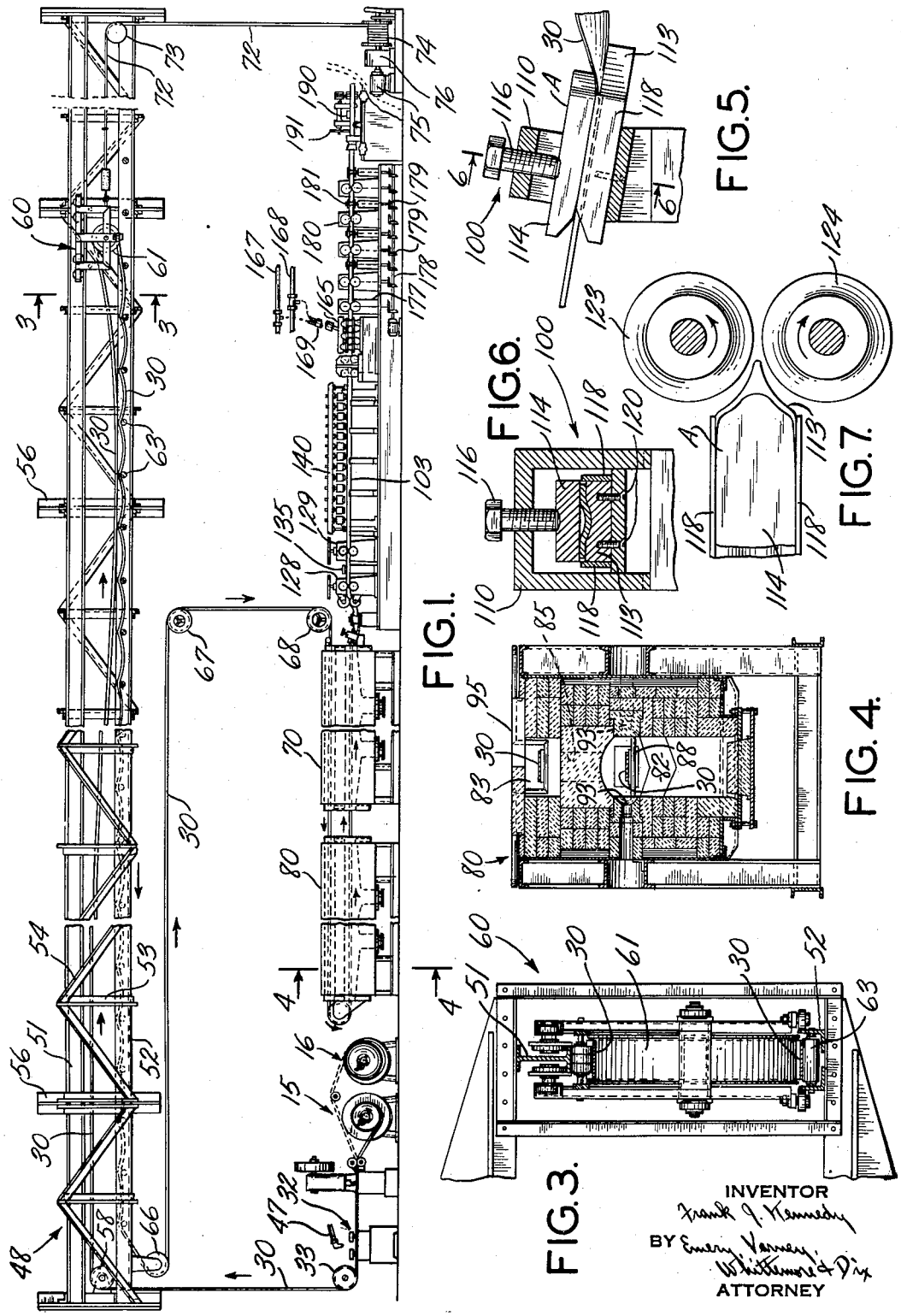

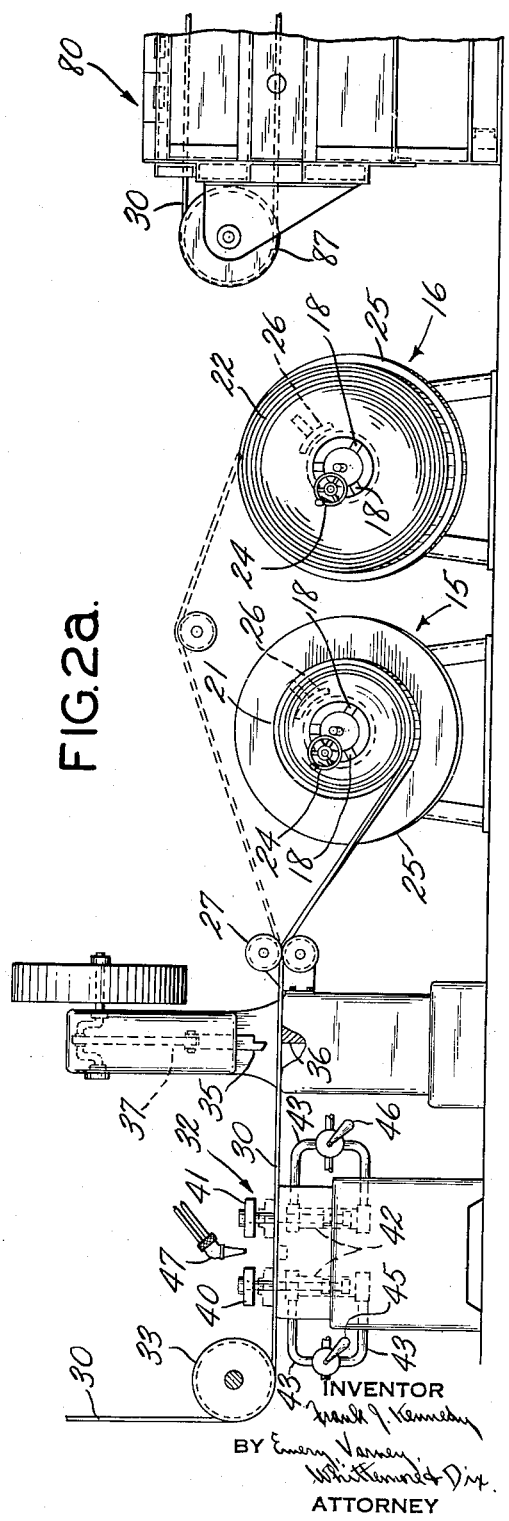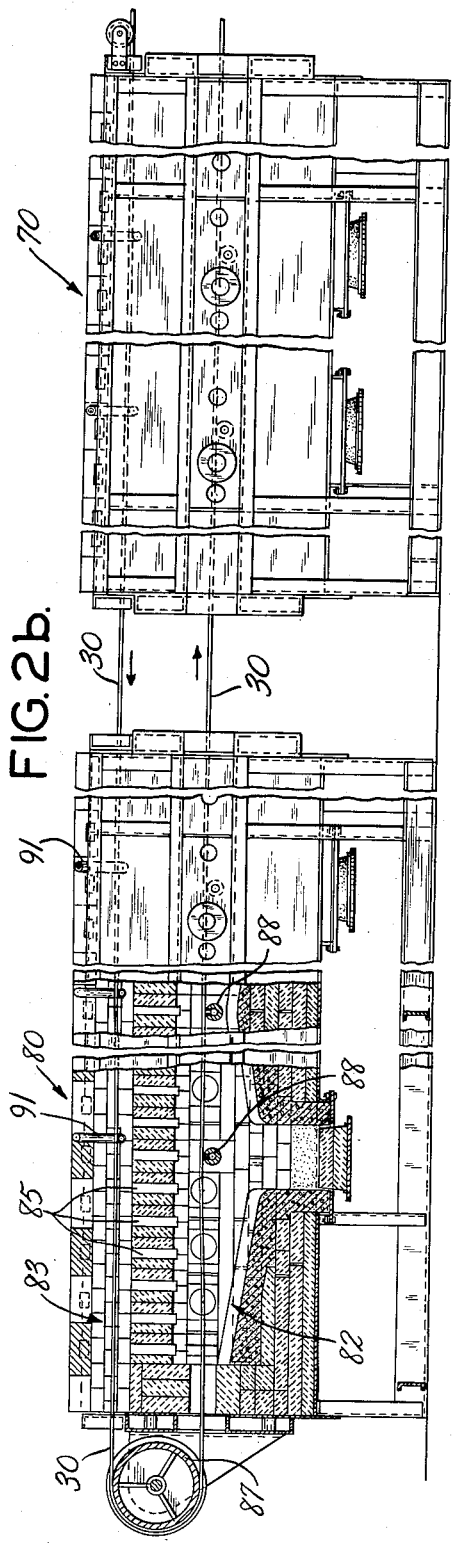

June 5, 1956

F. J. KENNEDY 2,748,734

CONTINUOUS TUBE WELDING APPARATUS WITH MULTI-STAGE HEATING

Filed Nov. 9, 1950

5 Sheets-Sheet 3

INVENTOR
Frank J. Kennedy
BY
ATTORNEY

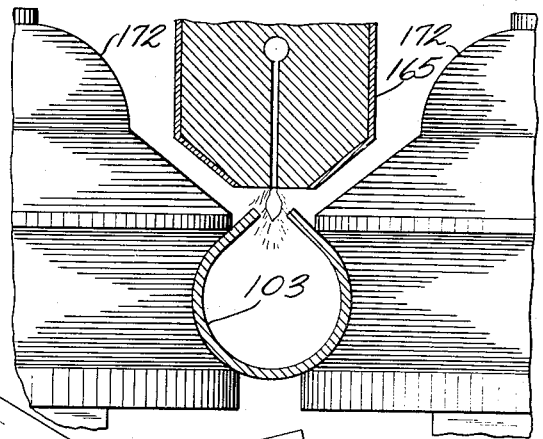
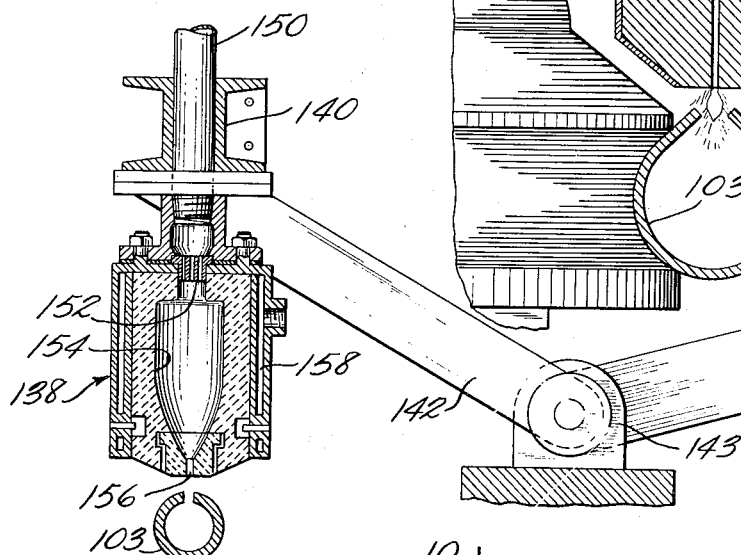
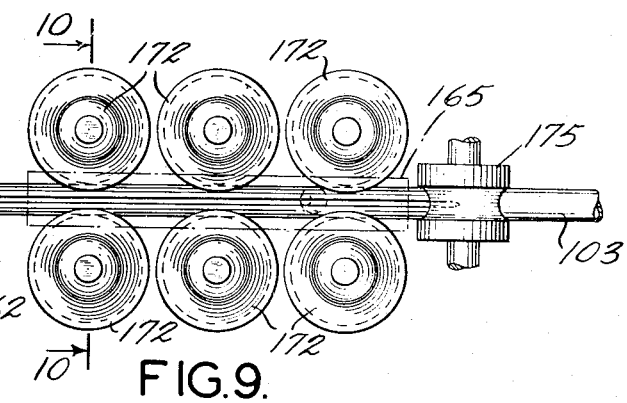
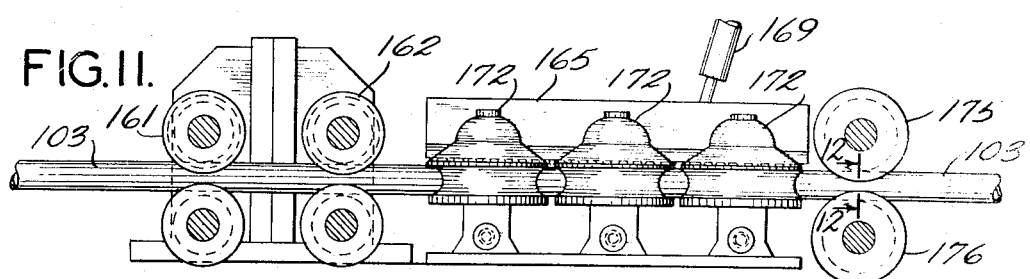
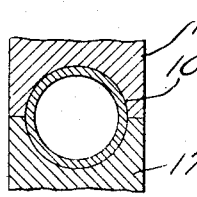

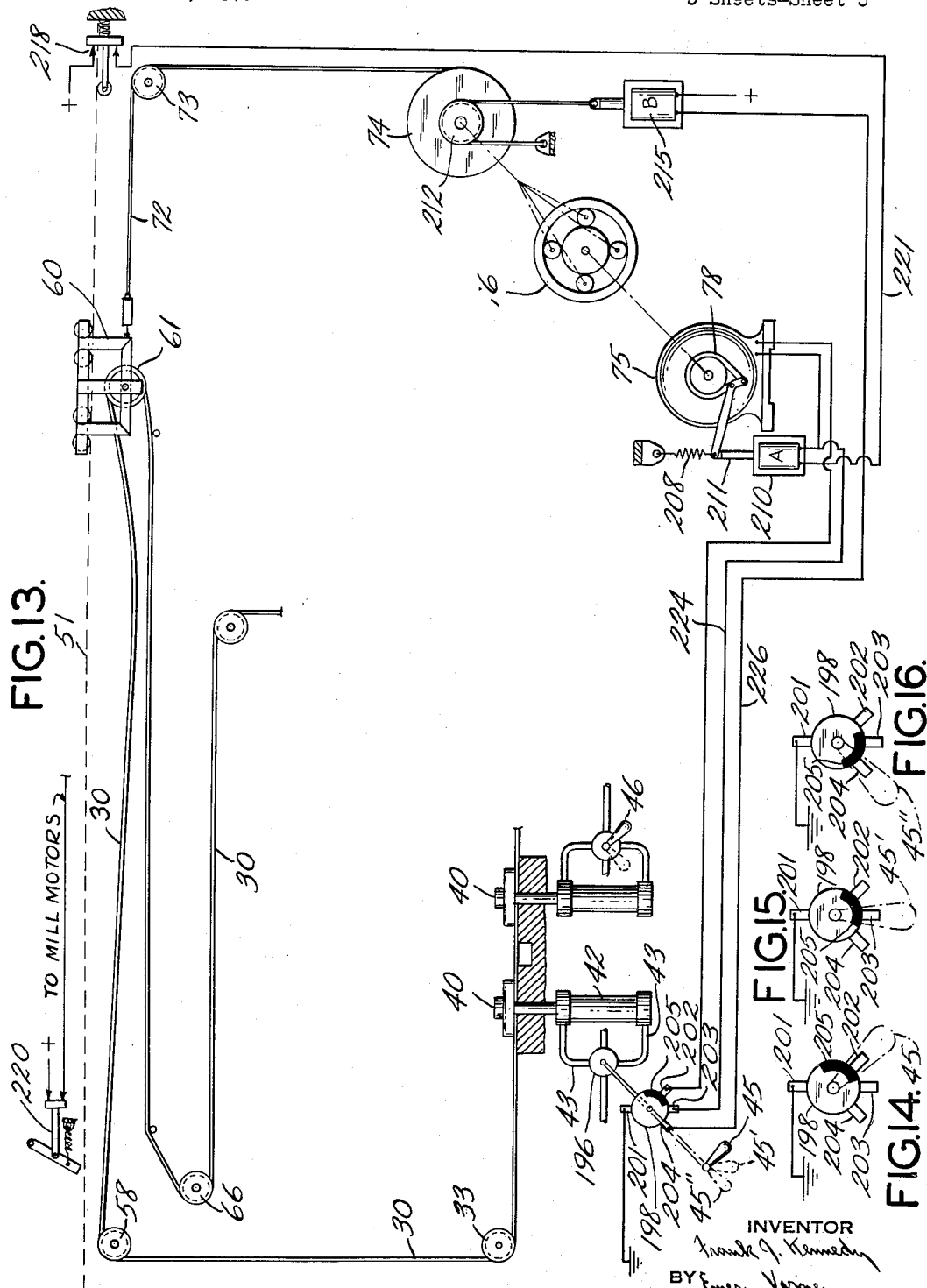

United States Patent Office 2,748,734
Patented June 5, 1956

2,748,734

CONTINUOUS TUBE WELDING APPARATUS WITH MULTI-STAGE HEATING

Frank J. Kennedy, Mount Lebanon, Pa., assignor to National Electric Products Corporation, Pittsburgh, Pa., a corporation of Delaware Application November 9, 1950, Serial No. 194,901

8 Claims. (Cl. 113—33)

This invention relates to apparatus for making welded tubing from flat skelp, and the invention is concerned particularly, though not entirely, with apparatus used for continuous methods and apparatus suitable for skelp of the thickness that is employed for heavy wall electric conduit. The manufacturer of welded tubing or conduit from flat skelp presents additional problems when the thickness of the skelp is increased; but in order to make the tubing economically, the manufacture must be at high speed so that the cost of labor, machine time and general overhead can be distributed over a substantial production.

Although the invention will be described in connection with the manufacture of heavy wall welded tubing or conduit, the terms "tubing" and "conduit" being used synonymously herein, it will be understood that the same method and apparatus can be used also for lighter wall tubing.

In its broader aspects, it is an object of the invention to provide improved apparatus for making welded tubing, more especially tubing of heavy wall thickness, with the seam free of flash, particularly on the inside where a sharp flash makes welded tubes unsuitable for use as conduits for electric wiring.

Other objects of the invention are to provide improved apparatus for the manufacture of welded tubing in continuous processes. One feature of the invention relates to the heating of the flat skelp which is passed through a heating chamber where burners direct heating jets against the opposite edge faces of the skelp and across the top and bottom surfaces to raise the entire width of the skelp to an elevated temperature, but with more highly heated zones along the edges to compensate for the higher heat losses from the edge zones in the forming operation that immediately follows the furnace heating.

Another feature relates to a guide or restraining means located between the furnace and a forming roll stand for removing any camber that remains in the skelp and for holding the skelp down in the forming roll pass so that the heated skelp can be formed in a single roll pass of a design having a fairly wide top opening which leaves the edges of the tube blank extending upwardly for more direct heating under subsequent heating jets.

Still other features of the apparatus relate to the progressive treatment of the seam edges to avoid wavy edges, to insure a straight seam and to heat the tube blank most economically for subsequent welding without sacrifice of speed. At the end of the mill, the continuous welded tube is cut to length by a flying cut-off saw to produce welded tubes of substantially uniform and pre-determined length.

Other objects, features and advantages of the invention will appear or be pointed out as the description proceeds.

Figure 2D:
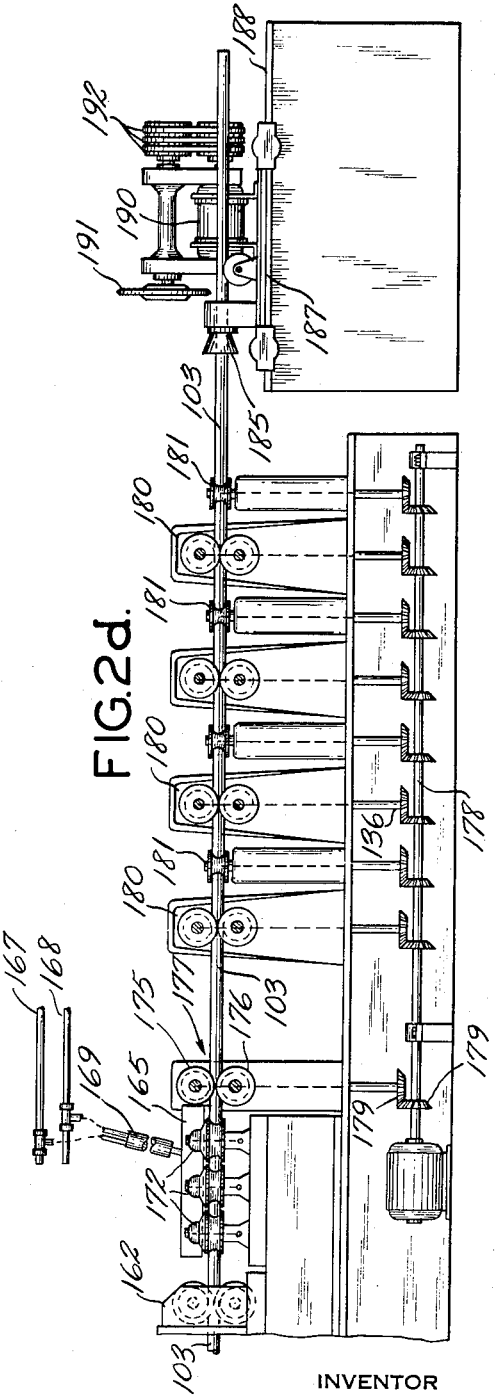

In the drawing, forming a part hereof, in which like reference characters indicate corresponding parts in all the views, Figure 1 is an assembly view showing the mill and slack accumulator, Figures 2A, B, C and D are enlarged views, partly in section, showing the apparatus of Figure 1 on a larger scale, Figure 3 is a greatly enlarged view taken on the line 3—3 of Figure 1, Figure 4 is an enlarged view taken on the line 4—4 of Figure 1, Figure 5 is an enlarged view of the guide and restraining means through which the skelp passes as it leaves the furnace, Figure 6 is a sectional view taken on the line 6—6 of Figure 5, Figure 7 is a top plan view showing the relation of the apparatus of Figure 6 to the forming roll stand immediately beyond it, Figure 8 is an enlarged sectional view taken on the line 8—8 of Figure 2C, Figure 9 is an enlarged top plan view of the welding block shown at the left hand end of Figure 2D, Figure 10 is a sectional view taken on the line 10—10 of Figure 9, Figure 11 is an enlarged side elevation of the welding block, Figure 12 is a sectional view through the forming roll stand, Figure 13 is a diagrammatic view showing control mechanism of the mill, Figures 14, 15 and 16 show different positions of the control mechanism.

Figure 1 shows the complete mill with provision for accumulating slack which is used to supply the mill during periods when new lengths of skelp are being connected to the strip of skelp already in the mill. Reels of flat skelp for making tubing of the desired wall thickness, are carried on reel holders 15 and 16 near the left hand end of the mill shown in Figure 1. The construction and operation of these reel holders 15 and 16 can best be understood by reference to Figure 2A. Each of the reel holders has legs by which it is supported from the floor and each reel holder has three jaws 18 that are movable radially from a center hub 19. The hub 19 is smaller than the center openings of skelp reels 21 and 22 so that the reel can be initially placed over the hub 19 and the jaws 18 can then be extended outwardly to center the reel on the holder.

The jaws of the skelp reel holders move in unison in a manner similar to the jaws of a drill chuck, and they are moved by rotating a hand wheel 24. The hand wheels 24 are detachable from their axes so that they are not in the way when a reel of skelp is being swung into position on the center hub 19 by a crane. The reel holder hubs 19 slope downwardly toward the rear at a slight angle so that the reels of skelp are retained on the reel holders by gravity. There is a shield 25 at the back of each reel holder for keeping the convolutions of the reels in line as the reels unwind.

The reels 15 and 16 are preferably wound in opposite directions so that with skelp made by slitting wider sheets, the burrs along the edges of alternate strips of skelp can be turned in the same direction when the strips are connected together for supplying the mill. It is preferable to have the burrs on both edges of the skelp turned upward in the formed tube. This permits them to be smoothed outward by the rolling after welding. Another advantage in having the burred edges turned outward is that the side of the skelp opposite the burr edges often has some bevel to the corners as a result of the slitting operation and this leaves a longitudinal depression inside of the tube into which any excess molten metal can be displaced during the welding operation without forming a flash on the inside of the tube.

The hub 19 of the reel holders have friction brakes 26 which resist the unwinding of the reels 21 and 22. This produces a tension in the strip during its movement through the subsequent heating furnace so that camber in the skelp is eliminated. If the tension and temperature of the skelp in the furnace is not sufficient to eliminate all camber, any remaining camber is eliminated in the region of the forming apparatus in a manner which will be explained in connection with the description of the treatment of the skelp as it passes from the furnace to the forming apparatus.

The flat skelp from the reel holder 15 passes under a guide roll 27 and across the bed of a high speed shear 28. From the shear, this skelp, indicated by the reference character 30, passes through a welding station 32 and then around a wheel 33 and upward to a slack accumulator.

The shear 28 is illustrated diagrammatically and includes shear blades 35 and 36 with the upper blade actuated by a crank and flywheel mechanism 37 having a one-turn clutch similar to that commonly used for punch presses. Such mechanism is well understood in the art and no illustration of it is necessary for a complete understanding of this invention. This shear 28 is merely representative of shearing means for cutting off ragged edges from the forward or rearward ends of skelp strips. The shearing blades 35 and 36 preferably extend at right angles to the direction of the length of the skelp so that the strip ends produced by the shearing operation are normal to the edges of the skelp.

At the welding station 32, the skelp passes through clamps 40 and 41 which are actuated by cylinders 42 supplied with working fluid through piping 43. The cylinders 42 are operated independently by manually actuated controls 45 and 46, respectively.

When all of the skelp in the reel 21 has been payed out, the operator stops further movement of the skelp 30 by operating the clamp 40, which clamps the skelp 30 firmly. The operator then pulls up a loop in the skelp 30 between the shear 28 and the welding station 32 and pulls the skelp through the shear 28 until only the irregular end portion of the skelp remains beyond the shear. He then actuates the shear to cut off the irregular end of the strip, leaving a smooth end for connection with the next length of strip. The clamp is then released and the skelp is allowed to advance until the sheared end of the skelp is centered between the clamps 40 and 41.

The forward end of the new reel 22 is then pulled through the shear 28 far enough to bring any irregular end of the metal beyond the shear 28, and the shear is operated to produce a smooth and even edge on the new strip. This smooth edge is brought forward into the welding station and into substantial abutment with the rearward end of the strip ahead. The clamp 41 is then operated to hold the end of the new strip in position, and the abutting ends are secured together by welding with a torch 47. This torch is shown as a hand torch, but it will be understood that it is merely representative of welding means for securing the edges of the strips together to increase the length of the strip by adding a new reel of skelp.

As soon as the weld is completed, both of the clamps 40 and 41 are released and the skelp again advances to the mill. Soon after the supply of skelp has been thus restored, the skelp is taken from the new reel at an accelerated rate so as to accumulate the slack for use during the next welding operation. When the reel 22 on the holder 16 is unwinding, a new reel is placed on the holder 15 and the end of the new reel is secured to the rearward end of the reel 22 when the latter reel is used up, the procedure being the same as already described. It will be evident that with the apparatus shown and the procedure described, a continuous strip of skelp can be supplied to the mill indefinitely.

Referring again to Figure 1, the skelp 30 passes around the wheel 33 and upward to a slack accumulator generally indicated by the reference character 48. This slack accumulator comprises a rail frame made up of upper and lower channels 51 and 52 connected together by vertical frame members 53 and by diagonal braces 54. The track is made in sections that are connected together and there are brackets 56 at spaced regions along the track connecting it to the building structure in which the mill is housed. It is a feature of the invention that the slack accumulator extends in the same direction as the mill and that it is located at a higher level than the mill where it occupies space that would not otherwise be used.

The skelp 30 passes around a wheel 58 at one end of the track frame, and from the wheel 58 the skelp extends lengthwise of the track frame to a carriage 60 which is movable along the track comprising the channels 51 and 52. This carriage will be described more fully in connection with Figure 3, and for the present it is sufficient to understand that there is a wheel 61, supported by the carriage 60, and about which the skelp 30 passes to form a loop by reversing the direction of the skelp. The skelp 30 then passes back across roller supports 63 located at spaced regions along the lower channels 52. The returning skelp passes around other wheels 66, 67 and 68 which change its direction of travel and eventually bring it into alignment with the entrance of an upper chamber of a furnace 70.

The carriage 60 is pulled along the slack accumulator track, in the direction to increase the accumulation of skelp, by a cable 72 which extends around a wheel 73 and downward to a drum 74 on which the cable wraps. This drum 74 is driven by an electric motor 75 through planetary gearing 76. There is a brake 78 on the motor. This mechanism for winding up the cable 72, to control the slack accumulation, will be described more fully in connection with Figure 13, and for the present it is sufficient to understand that the motor 75 drives the drum 74 to wind up the cable 72 and pull the carriage 60 toward the right hand end of the slack accumulator 48 during periods when skelp is available from a reel on one of the reel holders 15 or 16. When the carriage 60 has been pulled to the end of the slack accumulator track, it operates a limit switch to stop the motor 75 and apply the brake to prevent unwinding of the cable 72 from the drum 74.

When the supply of skelp is interrupted by operation of the clamps at the welding station 32, the brake 78 is released so that the drum 74 can be turned and permit the cable 72 to unwind. As the mill takes the skelp 30 from the slack accumulator, the pull on the cable moves the carriage 60 toward the left and decreases the slack accumulation progressively until the clamps at the welding station 32 are released. The carriage 60 then reverses its direction of movement, it being pulled toward the right again by the motor 76 which is supplied by power through a control switch coordinated with the operation of the clamps at the welding station, in a manner which will be more fully explained in connection with Figure 13.

The movement of the skelp 30 through the furnace 70 and a similar furnace 80 can best be understood by reference to Figure 2B. The furnaces 70 and 80 are of similar construction and it is, therefore, sufficient to show a portion of one of them in section. Each furnace is constructed of brick or other heat resistant ceramic with metal frames for holding the brickwork; and each furnace includes a main heating chamber 82, and a secondary heating chamber 83 into which exhaust gases from the main heating chamber pass through exhaust conduits 85. At one end of the furnace 80, the skelp passes around a wheel 87 that reverses the direction of movement of the skelp and brings it into alignment with the entrance to the main heating chamber 82.

In the main heating chamber 82, the skelp is supported at space regions along its length by supporting tubes 88 extending across the main heating chamber and cooled by water passing through them. The supporting tubes 88 are preferably provided with hard facing metal on their top surfaces with which the skelp contacts, and there is ceramic insulating material around the lower portions of the supporting tubes 88. In the secondary heating chamber 83, the skelp is supported from tubes 90.

Figure 4 shows a sectional view through the furnace 80 and shows the location of gas burners 93 which heat the main chamber 82 of the furnace. These gas burners 93 are located in rows along opposite sides of the main heating chamber 82 and in position to direct their heating jets inward against the edges of skelp. This location of the burners directed toward the edges of the skelp results in a heating of the edges to a somewhat higher temperature than the body of the skelp and compensates for the additional loss of heat from the edges in a subsequent forming of the skelp.

The burners 93 are preferably staggered so that their heating jets also flow across the top and bottom surfaces of the skelp 30. The products of combustion from burners 93 rise through the exhaust conduits 85 under the skelp 30 in the secondary heating chamber 83 where the hot gases heat the skelp substantially uniformly across its full width. At the top of the furnace, the secondary heating chamber 83 is partially closed by blocks 95 extending from opposite sides in staggered relation so as to leave two rows of staggered outlets which have the effect of promoting a better circulation of the exhaust gases in the secondary heating chamber 83.

Figure 2-C shows the discharge end of the furnace 70 from which the skelp 30 is pulled downward over a guide 98. The downwardly extending portion of the skelp travels through a restraining device 100 and is then deflected forwardly again into a forming roll stand 102 where it is formed into a tube blank 103 having a seam cleft at the top of the blank. As the tube blank 103 comes from the forming roll stand 102 it has an upward deflection which results from the forming operation, and the extent of which depends upon the temperature of the metal. A roll stand 105 is located immediately beyond the forming roll stand 102, and at a height which makes the roll stand 105 give the tube blank 103 a bend or bow in a direction away from the seam cleft. This has the effect of stretching the seam edges and removes waves that are sometimes produced by the forming operation because of variations in thickness and heat absorption.

Figure 5 shows the restraining device 100 on an enlarged scale and partially in section. This device comprises a frame 110 supported from the furnace by a bracket 111. The frame supports a bottom shoe 113 which is rigidly connected with the frame. Skelp 30 passes across the bottom shoe 113, and there is a top shoe 114 located over the top surface of the skelp. Shoes 113 and 114 have sloping end portions that provide a flaring inlet for the skelp, the principal purpose of this flaring inlet being the admission of transverse welds into the space between the shoes 113 and 114. The regions at which successive lengths of skelp are connected together by welding are usually thicker than the body of the skelp itself, and for this reason the upper shoe 114 is adjusted to provide space under it somewhat greater than the thickness of the skelp 30 and sufficient to permit passage of the welds that connect the successive lengths of skelp. This adjustment of the upper shoe 114 with respect to the bottom shoe 113 is effected by a screw 116 threaded through the top of the frame 110.

Figure 6 shows a section through the restraining device 100, and in the construction shown there are side guides 118 extending upward on either side of the top surface of the lower shoe 113. These side guides 118 prevent transverse displacement of the skelp in the restraining device 100. The bottom shoe 113 is held against both longitudinal and transverse displacement by fastening means 120 connecting the bottom shoe to the frame 110. The upper shoe 114 is held against displacement by the screw 116, and dowel pins from the frame 110 can be used for providing additional restraint for the upper shoe 114, if desired.

The restraining device 100 serves several different purposes. It provides frictional surfaces across the entire width of both the top and bottom of the skelp for removing any camber that remains in the skelp if the tension and temperature in the furnace are insufficient to effectively remove all camber.

In the preferred method of operating this invention, the flat skelp comes from the furnace with the body of the skelp at temperatures up to at least 1350° to 1450° F. for furnaces without a controlled atmosphere, and higher temperatures up to about 2100° F. with controlled furnace atmosphere, and with the edge portions of the skelp somewhat hotter. The shoes 113 and 114 are preferably hollow and have cooling water circulating within them. This is a common expedient with mill equipment and no illustration of it is necessary for the complete understanding of this invention.

Another function of the restraining device 100 is its cooperation with the forming roll stand 102. In order to produce a tube blank which has a non-circular upper portion and edge portions along the seam cleft extending upward for the direct impingement of subsequent flame jets, it is necessary to have a substantial clearance between the upper portions of the forming rolls and this sometimes permits the rapidly forming skelp to jump out of the forming roll pass through the clearance at the top of the pass.

The shoes 113 and 114 extend close to the forming roll stand 102 and part way into the space between the forming rolls, as best shown in Figure 7. This provides a control of the skelp and holds the skelp down in the forming roll pass. The shoes 113 and 114 extend so close to the forming roll stand that the skelp begins to form before it leaves the space between the shoes 113 and 114. The lower end portion of the bottom shoe 113 is made concave near the middle so as to permit this initial forming of the skelp, and each of the shoes 113 and 114 is shaped so that it becomes narrower near its lower end to permit it to extend part way into the space between the forming rolls while maintaining control of the skelp for as long as possible.

The rolls in the forming roll stand 102 are indicated by the reference characters 123 and 124 in Figure 7. No cross section of these rolls is necessary because they are similar in shape to the welding rolls shown in Figure 10, except that they extend across substantially the entire bottom of the tube blank in accordance with conventional forming roll design. It is a feature of the invention that the tube blank 103 is formed with its upper part non-circular and with the edge portions of the seam cleft extending upwardly as shown in Figure 10. This permits direct impingement of subsequent heating flames on the edge face and has resulted in very substantial increase in the speed at which the tube blank can be advanced through the mill. In a mill of the type disclosed in the drawing, with initial furnace preheat and two stages of subsequent heating by different kinds of flames along successive zones, the upwardly extending edges of the seam cleft have made it possible to more than double the production in the mill.

Beyond the roll 105 there are guide roll stands 128 and 129 with screw downs operated by hand wheels 130 for controlling the width of the roll passes through these stands 128 and 129 and the resulting friction grip of the rolls upon the tube blank. In both of the roll stands 128 and 129 the upper roller is shaped to leave the tube blank with a non-circular upper portion and with the edges of the seam cleft extending upwardly as shown in Figure 10.

A fin 133, supported from the frame of the mill by a bracket 135, extends into the seam cleft for maintaining the seam cleft at the top of the tube blank. If desirable, the upper roll of each of the roll stands 123 and 129 can be made as a fin roller for the same purpose.

The tube blank 103 passes quickly from the forming roll stand 102 to an intermediate heating zone in which the tube blank passes under a long row of gas burners 138 each supported from a common frame 140. This frame 140 is supported by arms 142 which swing on pivot bearings when the gas burners 138 are to be moved away from or back to their working position above the seam cleft of the tube blank. The tube blank is supported by pedestals 145 located at spaced regions along the length of the tube blank under the burners 138.

Figure 8 shows the way in which the frame 140 is supported from the bearings 142 by the pivot bearings 143. This figure also shows the internal construction of one of the burners 138.

An air-fuel mixture supplied through piping 150 is discharged through jet orifices in a burner insert 152. Flames from these jet orifices burn within a refractory chamber 154 and the products of combustion, together with some secondary flames, are discharged through a row of central jet orifices 156 at the bottom of the burner. These burners provide an efficient source of heat because their internal combustion causes the refractory lining to be highly heated and the combustion takes place under some pressure so that a high heat output is obtained from the burning of the fuel. In order to prevent damage to the burners by overheating, there are water jackets 158 around the outside of the thick refractory walls of the combustion space of each burner.

As the tube blank 103 moves under the row of heating burners 138, the flame jets from the burners are directed downwardly into direct impingement with the upturned edge faces of the seam cleft. Some of the heating jets enter the tube blank through the open seam cleft, and other portions of the heating jets pass downwardly around the outside of the tube blank to heat the entire circumvential extent of the tube blank with a gradual and soaking heat.

The flame heating jets from the burners 138 have a temperature of the order of from 2800° to 3000° F. This is of the order of the melting point of the metal. The purpose of the burners 138, with their limited flame temperatures and substantial extent lengthwise of the tube, is not only to restore heat losses that occur after the skelp leaves the furnace and to concentrate heat in the edges of the seam cleft, but to soak the heat into the metal for a substantial period of time so that the metal for a substantial distance back from the edge faces can be highly heated without danger of melting away the edge faces of the seam. This produces a gradual temperature gradient behind the edge faces which reduces the rapidity of heat loss from the edge face when subjected to high intensity flames from a subsequent welding torch, and the gradual temperature gradient makes the heating of the edges for welding less critical. The intermediate heating by the burners 138 also reduces the amount of heating required from the more expensive oxyacetylene flames used in the welding step.

Beyond the intermediate heating zone provided by the burners 138, the tube blank 103 travels through guide roll stands 161 and 162 to a welding block. The expression "welding block" is used to designate the apparatus that cooperates to effect the final heating and closing of the seam cleft to join the edges.

The upper rolls in the roll stands 161 and 162 are preferably fin rolls for maintaining the seam cleft straight and at the top of the tube blank as the tube blank is advanced under a welding torch 165 (Fig. 2–D). This torch is supplied with oxygen and fuel gas, preferably acetylene, through piping 167 and 168 respectively. The oxygen and acetylene are fed into a mixer 169 from which the mixed gases flow into the top of the torch 165.

As the tube blank 103 advances under the torch 165, the upturned seam edges are subjected to the direct impingement of high intensity, oxy-fuel gas flame jets as illustrated in Figure 10. The seam cleft is prevented from opening up under the high intensity heating by three pairs of restraining rolls 172 that turn on substantially parallel vertical axes at spaced regions along the length of the torch 165.

The length and heating intensity of the flame system from the torch 165 is correlated with the speed of travel of the tube blank 103 so that the edges of the seam cleft are raised to a welding temperature by the time they reach the end of the welding period. In the preferred operation of this invention, the edge faces are heated to a condition of surface fusion with sufficient super heating so that they remain fused as they travel quickly into the pass between welding rolls 175 and 176 in a roll stand 177 to which power is supplied from a shaft 178 through bevel gearing 179. The power driven rolls 175 and 176, and power driven sizing rolls which follow the welding rolls supply the tension that pulls the tube through the mill and that pulls the skelp through the furnace against the resistance offered by the brakes.

The welding rolls 175 and 176 are on substantially parallel horizontal axes so that the upper welding roll 175 serves as an ironing roller for smoothing the seam. The faces of the welding rolls 175 and 176 are shaped to give the welded tube a circular contour.

Although the regions at which heat is applied to skelp and tube blank are spaced to allow space for the apparatus which guides, forms, and restrains the tube blank, the speed of travel of the skelp is high and this reduces the heat loss while passing from one heating region to another. The most substantial heat loss is between the furnace and the intermediate heating station provided by the burners 138. Heat loss is inevitable in the forming operation because of the necessary contact of the metal with the shoes of the restraining device 100 and with the faces of the rolls in the forming roll stand 102. There are other heat losses from contact with the roll 105 and the driving rolls in the roll stands 128 and 129.

With this invention there are substantial economies of heating affected by the particular combinations of apparatus. For example, the heat loss in the edges of the skelp is greater during forming than the heat loss from the body of the skelp and at least a substantial part of this is compensated for by the way in which the flat skelp is heated in the furnace to produce more highly heated zones along the edge faces of the skelp without resorting to excessive heating of the entire body which would seriously reduce the strength of the skelp and its ability to resist the tension to which it is subject during the feeding of the skelp into the mill. The restraining device 100 with the forming roll stand 102 effects a saving of heat by doing the entire forming operation in a single roll stand. This is practical, in a stand which produces the upturned edges of the seam cleft used with this invention, because of the use of the restraining shoes ahead of the forming roll stand for holding the skelp down in the forming roll pass and at the same time removing any camber that remains in the skelp. The roll 105 imparting the reverse bend to the tube blank just beyond the forming roll stand has made the adjustment of the mill less critical and has produced tube blanks with smoother edges.

The heating ahead of the forming roll stand 102 is necessary in order to make it practical to bend skelp of substantial thickness in a single forming roll stand, and another advantage of using furnace pre-heat before forming is that the flat skelp is more easily handled in a furnace and the forming apparatus is less complicated. The tube blank is still in a highly heated condition when it reaches the intermediate heating station provided by the burners 138, and the distance between the last burner 138 and the welding block is preferably no greater than necessary to provide space for the roll stands 161 and 162 which provide insurance of the proper location of the seam cleft into which the fins of the upper rolls in the stands 161 and 162 project. In the drawing, the distance between the parts is exaggerated in order to provide space for reference characters and in order to illustrate the construction more clearly.

Beyond the welding block, the welded tube, designated by the same reference character 103 as the tube blank, passes through a series of roll stands 180, having rolls with horizontal axes, and other intermediate roll stands 181 having rolls that turn on substantially vertical axes. These roll stands 180 and 181 reduce the size of the tube to a pre-determined diameter, and the rolls in all of the roll stands 180 and 181 are preferably power driven from the shaft 178 through bevel gearing 179.

The rolls in the successive sizing roll stands 180 and 181 must have progressively higher peripheral speed to compensate for the increase in the length of the tubing as the tube is reduced in size. In the construction shown, all of the rolls in the sizing roll stands 180 and 181 are of the same effective diameter but the speed ratio of the bevel gearing that drives these sizing roll stands is progressively higher so that the rolls of each successive stand are driven with an angular speed of the order of three per cent higher than the angular speed of the rolls of the preceding sizing roll stand.

The tubing 103 passes from the last sizing roll stand 181 through a guide 185 at one end of a cut-off mechanism. This cut-off mechanism comprises a carriage 187 that moves along a track 188 parallel to a direction of movement of the tubing. There is a motor 190 on the carriage which drives a saw 191 through belts 192 that transmit power from a motor pulley to a similar pulley on the end of the shaft by which the saw 191 is carried.

The carriage 187 is moved in coordination with the speed of movement of the tubing 103 so that the carriage is traveling at the speed of the tube when it comes even with the point at which a cut is to be made. The mechanism carrying the saw is then moved to push the saw through the tube, and the carriage 187 then stops and returns to repeat its cycle. Such flying saws are well understood in the tube making art and no further description of it is necessary for a complete understanding of this invention.

Figure 13 shows diagrammatically the control mechanism for the slack accumulator and the way in which this control mechanism is coordinated with the operation of the clamps that hold the ends of the skelp for welding. The controller 45 operates a valve 196 for successively connecting alternate ends of the cylinder 42 with fluid under pressure while connecting the other end of the cylinder with an exhaust outlet. The valve 196 is so constructed that movement of the controller 45 into a second position 45' reverses the fluid flow in the cylinder 48 and causes the clamp 40 to open. Movement of the controller into a third position indicated by the reference character 45'' has no further effect upon the operation of the cylinder 42.

Switch means 198, operated by the controller 45, control the operation of the slack accumulator. In actual practice the switch means include relays, but for illustration of the invention the switch means are shown as a simple three position rotary switch with brushes 201, 202, 203 and 204. This switch closes the circuit between the common brush 201 and any of the other brushes 202, 203 and 204 that is not in contact with the insulating segment 205 shown in black in Figures 13–16.

The motor brake 78 is operated by a spring 208 which applies the brake to prevent rotation of the motor shaft. A solenoid 210 has a plunger 211 connected with the brake 78 to exert force against the spring 208 in a direction to release the brake 78 whenever the solenoid 210 is energized. The motor brake 78 may be located on either the motor shaft or on the outlet shaft of the transmission 76 or on the drum 74, but it is most advantageously located on the motor shaft because the motor turns at higher speed than the drum and requires less braking effort in order to hold the drum 74 from turning.

There is a drag brake 212 on the drum 74 for preventing the drum from turning too freely when the carriage 60 is being pulled along the track by a reducing loop of skelp. It will be evident that the drag brake 212 could be located on the carriage wheels, but its location at the drum is simpler mechanically because the drum remains at a fixed location. A solenoid 215 operates to make the brake 212 drag whenever the solenoid 215 is energized. This solenoid 215 is merely representative of electromagnetic means for retarding movement of the carriage in a direction in which the carriage is pulled by a decreasing loop accumulation.

There is a switch 218 at the right-hand end of the carriage track in position to be opened by the carriage as the latter approaches its limit of movement toward the right-hand end of the track. There is another limit switch 220 near the left-hand end of the carriage track in position to be operated by the carriage when the lop of accumulated slack becomes substantially exhausted. This switch 220 is connected in the mill circuit so as to stop the entire mill when no further skelp is available from the loop.

In the circuits illustrated in Figure 13, the limit switch 218 is connected in series with the solenoid 210 by a conductor 221, and this circuit continues from the other side of the solenoid 210 through the motor 75 to the brush means 202 of the control switch means 198. When the switch means are in the position shown in Figures 13 and 14, or in the position shown in Figure 15, the circuit is open at the brush 202.

There is another circuit, however, from the side of the solenoid 210 that is connected with the motor 75. This other circuit includes a conductor 24 which leads to the brush 203 at the switch means 198, and this circuit is closed when the controller 45 is in the position shown in Figures 13 and 14; but it is open when the controller 45 is moved to its second and third positions. The electromagnetic means that operate the drag brake 212 is connected to one side of the power line and is connected by a conductor 226 to the brush 204 of the switch means 198.

With this coordination of the clamp controller 45 and the switch means for the motor which moves the carriage 60, it will be apparent that when the clamp 40 is closed as shown in Figure 13, the supply of power to the motor 75 is shut off, the solenoid 210 is energized so as to release the brake on the motor shaft and the electromagnetic means 215 are energized to apply the drag brake 212. In this condition, with the supply of skelp temporarily interrupted, the skelp 30 moving toward the mill takes slack from the accumulated loop and pulls the carriage 60 along the track, and unwinds the cable 72 from the drum 74. The planetary gearing 76 is reversible so that this unwinding of the cable 72 from the drum turns the planetary gearing and the motor 75, thus permitting the drum to turn and unwind the cable without the use of a clutch that would be necessary if the motor drove the drum through irreversible worm gearing. As soon as the operator has finished welding a new reel to the skelp strip at the clamp 40 he moves the controller 45 into its second position 45', and this releases the clamp and leaves the skelp free to move.

The mill can now pull the skelp from the new reel, but in order to insure that the skelp will be taken from the new reel, instead of from the remaining slack accumulation, the movement of the controller 45 into its second position also moves the switch means 198 into the position shown in Figure 15 which opens the circuit of the solenoid 210 and permits the brake 208 to stop further rotation of the motor shaft. This prevents further unwinding of the cable 72 from the drum 74 and stops the movement of the carriage 60 along the track.

As soon as the mill is taking its required skelp from the new reel, the operator moves the controller 45 into its third position (45″) and while this has no effect upon the clamp 40 it does move the switch means 198 into the position shown in Figure 16 so that power is supplied to the motor 75 and to the solenoid 210 to release the motor brake. This same movement of the switch means 198 opens the circuit through the electro-magnetic drag brake actuator 215 so that the full power of the motor 75 is applied through the planetary transmission 76 to the drum 74 to wind up the cable 72 and pull the carriage 60 toward the right to restore the full accumulation of skelp to the loop.

The purpose in having the positions of the controller 45, in one of which the further movement of the carriage 60 toward the left is stopped and in the other of which the carriage 60 moves back toward the right-hand end of the track, is that the two stage operation relieves the skelp strip of the heavy tension that would be required to start the stationary portion of the skelp and the new reel from a state of rest to the high speed required during loop accumulation. It will be evident that skelp must be taken from the new reel at a very much higher rate than is used by the mill in order to restore the depleted loop before it becomes necessary to interrupt the skelp supply to attach a new reel.

As the carriage 60 approaches the right-hand end of its travel, it strikes against an abutment that causes the limit switch 218 to open the circuit through the conductor 221 to the solenoid 210 and the motor 75. This interrupts the flow of current to the motor and permits the spring 208 to apply the brake 78 to the motor shaft.

The preferred embodiment and mode of operation of the invention has been illustrated and described, but changes and modifications can be made, and some features can be used alone and in different combinations without departing from the invention as defined in the claims.

I claim as my invention:

1. A continuous tube welding mill for making butt weld tubing, said mill comprising a furnace through which a flat skelp travels, forming apparatus at the outlet end of the furnace, means for directing the skelp in a downward direction as it is pulled from the furnace, said means comprising a pair of inclined plates located upon opposite sides of said skelp and adapted to restrain the pulling thereof, a single roll stand located immediately beyond said means in which the skelp is formed into a tube blank having a seam cleft at the top of said blank, one of said plates having a nose portion about which said skelp is preformed as it is directed into said roll stand, guide means immediately beyond the forming roll stand in position to bow the tube blank downwardly away from the seam to stretch the seam edges and remove waves that are sometimes produced by the forming operation because of variations in thickness and heat absorption, other guide means through which the tube blank passes, air fuel gas heating burners located along a substantial run of the seam cleft beyond the forming roll stand for concentrating heat in the region of the seam, and welding apparatus immediately beyond the heating burners including a torch that directs high intensity oxy-fuel gas flames against the seam edges to raise said edges to a welding temperature, and welding rolls that bring the seam edges into contact with one another to make a butt weld while at welding temperature.

2. In a tube mill to which a continuous strip of skelp is supplied for making butt weld tubing, a furnace through which the skelp travels continuously with the skelp flat, forming apparatus at the discharge end of the furnace including means for directing the skelp in a downward direction as it is pulled from the furnace, said means comprising a pair of inclined plates located upon opposite sides of said skelp and adapted to restrain the pulling thereof, a single roll stand located immediately beyond said means in which the skelp is formed into a tube blank having a seam cleft at the top of said blank, one of said plates having a nose portion about which said skelp is preformed as it is directed into said roll stand, at least one of said plates extending part way into the space between the rolls of the forming roll stand, said rolls being rotatable on substantially vertical axes and being shaped to form a roll pass that is open at the top to shape the tube blank with its upper half of non-circular contour and with the edge portions of the tube blank extending upwardly so that the edge faces are exposed to the direct impingement of flame jets directed downwardly toward the seam cleft, guiding means through which the tube blank passes beyond the forming roll stand, a row of gas burners extending along the seam cleft for a substantial length of the seam cleft beyond the forming roll stand in position to heat the tube blank to a higher temperature gradually with a concentration of heat in the edges along the cleft, and welding apparatus including a torch that directs, against the edge faces, flame jets of much higher temperature than the heating jets from said burners, the length and intensity of the welding torch being correlated with the speed of the continuous movement of the tube blank to raise the seam edges to fusion before the edge faces pass beyond the end of the torch, and a welding roll stand immediately beyond the welding torch in position to bring the fused edges of the tube blank into contact, the rolls of said welding roll stand being shaped to bend the tube blank to circular contour.

3. A continuous mill for making butt weld tubing including a furnace through which a flat skelp passes with continuous motion, gas burners in the furnace in position to direct heating jets against the edges of the skelp and across the top and bottom surfaces of the skelp so that the skelp comes from the furnace heated across its full width but with a concentration of heat in the edges, a forming station including a forming roll stand at the outlet end of the furnace to bend the furnace-heated skelp transversely into a tube blank with a longitudinal seam at the top of the blank and within a short length of the skelp so that the metal retains most of its furnace heat and the concentration of heat in the edges, guiding means through which the formed tube blank travels for a substantial length beyond the forming roll stand, means for increasing the temperature of the edges with gradual heat gradients behind the edges including an intermediate heating station having a row of air-fuel gas burners located above the seam of the tube blank along said substantial distance and directing heating jets of intermediate intensity against the seam edges and downwardly around the circumferential extent of the tube blank for supplying a soaking heat along the substantial length of said guiding means to replace heat lost from the skelp in the forming roll stand and guiding means, and lost from the edge regions by conduction to the center portion of the skelp and to raise the edges gradually toward a welding temperature, other guiding means for the tube blank immediately beyond the intermediate heating station, and a welding block adjacent to said other guiding means and at which a welding torch directs oxy-fuel gas flames against the seam edges, the length and intensity of the flame jets of the welding torch being correlated with the speed of travel of the tube blank to bring the edge faces of the seam to a state of fusion by the time that they reach the end of the torch, and welding rolls immediately beyond the torch in position to bring the fused edge faces together to make a butt weld.

4. The continuous mill described in claim 3 and in which the gas burners on the opposite sides of the furnace are in staggered relation to one another, and the apparatus at the discharge end of the furnace for forming the skelp into a tube blank having a seam cleft along the top of the tube blank comprises a single roll stand located at a level lower than the level of the skelp as it comes from the furnace.

5. The continuous mill described in claim 3, and in which the burners in the furnace are staggered on opposite sides of the skelp and their heating capacity is correlated with the speed of travel of the skelp to heat the skelp across its full width to a temperature of at least 1350° to 1450° F. with the edges of the skelp at a somewhat higher temperature, and in which the rolls in the forming roll stand are of a contour to bend the tube blank to a non-circular contour with the edge portions extending upwardly for receiving the direct impingement of the gas flames on the edge faces of the seam, and in which there are rolls adjacent to the welding block for bending the tube blank to circular contour.

6. A continuous tube welding mill for making butt weld tubing including a furnace through which a flat skelp travels with continuous motion, a forming station at the discharge end of the furnace including a single roll stand in which the skelp is formed into a tube blank having a seam cleft at the top of the blank and at a location within a short length of the skelp from the furnace so that the metal retains most of its furnace heat, the forming roll stand being located at a level below the discharge end of the furnace, means for directing the skelp in a downward direction as it is pulled from the furnace, said means comprising a pair of inclined plates located upon opposite sides of said skelp and adapted to restrain the pulling thereof, one of said plates having a nose portion about which the skelp is preformed as it is directed into said roll stand, a guide over which the tube blank passes immediately beyond the forming roll stand, an intermediate heating station with a row of gas burners extending for a substantial length of the tube blank to replace heat lost from the skelp in the forming roll stand and guiding means and lost from the edge regions by conduction to the center portion of the skelp, and a welding block beyond the gas burners including a torch that directs against the edges of the seam cleft high intensity flame jets that bring the seam edges to a welding temperature by the time they reach the end of the welding torch, and a roll stand immediately beyond the torch in position to bring the edges of the seam cleft into contact to make a butt weld.

7. The continuous tube welding mill described in claim 6 and in which the furnace contains staggered gas burners upon opposite sides of the skelp in position to direct heating jets across the full width of the skelp from opposite edges to heat the skelp for its full width but with concentration of heat in the edge faces, the burners being of a size and capacity to heat the skelp across its full width to a temperature of at least 1350° to 1450° F. during its passage through the furnace and to heat the edges of the skelp to a somewhat higher temperature, the roll stand being of a contour to shape the tube blank to a non-circular cross section with the edge portions on opposite sides of the seam cleft extending upwardly, guide means that bow the tube blank away from the seam cleft beyond the forming roll stand to stretch the seam edges and eliminate any waves formed along the seam edges during the forming operation, the gas burners for the intermediate heating being disposed in position to impinge their flame jets directly on the upturned edge faces of the seam cleft and said gas burners being supplied with a fuel gas mixture which produces flames having a temperature of the order of the melting point of the metal of the tube blank, and the forming roll stand immediately beyond the torch including rolls that bring the seam edges together to make the butt weld and that also bend the tube blank to a circular contour.

8. In a tube welding mill having a furnace through which the skelp passes with continuous motion, and a single forming roll stand immediately beyond the furnace with rolls that provide a roll pass that is open at the top to shape the skelp to a tube blank having an open seam cleft at the top of the blank, the improvement which comprises means for directing the skelp in a downward direction as it is pulled from the furnace, said means comprising a pair of inclined plates located upon opposite sides of said skelp and adapted to restrain the pulling thereof, one of said plates having a nose portion about which said skelp is preformed as it is directed into said roll stand and by which the skelp is held down to prevent the partially formed tube from jumping out at the open top of the roll pass, and means that pull the skelp through the forming roll stand in a direction different from the direction of downward pull on the skelp.

References Cited in the file of this patent

UNITED STATES PATENTS

| Number | Name | Date |
|---|---|---|
| 679,469 | Price | July 30, 1901 |
| 706,031 | Daniels | Aug. 5, 1902 |
| 829,990 | McKee | Sept. 4, 1906 |
| 1,184,947 | Gossett et al. | May 30, 1916 |
| 1,319,862 | Gillespie | Oct. 28, 1919 |
| 1,652,396 | Dallas | Dec. 13, 1927 |
| 1,893,926 | Anderson | Jan. 10, 1933 |
| 1,904,599 | Anderson | Apr. 18, 1933 |
| 1,960,523 | Anderson | May 29, 1934 |
| 1,984,720 | Beattie | Dec. 18, 1934 |
| 2,014,982 | Quamstrom | Sept. 17, 1935 |
| 2,024,485 | Sussman | Dec. 17, 1935 |
| 2,127,618 | Remenschneider | Aug. 23, 1938 |
| 2,131,701 | Achterfeldt | Sept. 27, 1938 |
| 2,177,104 | Gonser | Oct. 24, 1939 |
| 2,178,451 | Jones et al. | Oct. 31, 1939 |
| 2,196,639 | McLaughlin | Apr. 9, 1940 |
| 2,205,821 | Nichols | June 25, 1940 |
| 2,209,373 | Anderson | July 30, 1940 |
| 2,214,157 | Bannister | Sept. 10, 1940 |
| 2,219,493 | Reed | Oct. 29, 1940 |
| 2,277,658 | Anderson | Mar. 31, 1942 |
| 2,302,163 | Anderson | Nov. 17, 1942 |
| 2,308,850 | Anderson | Jan. 19, 1943 |
| 2,366,243 | Edwards | Jan. 2, 1945 |
| 2,370,387 | Anderson | Feb. 27, 1945 |

FOREIGN PATENTS

| Number | Country | Date |
|---|---|---|
| 392,460 | Great Britain | May 18, 1933 |